US012710809B2

(12) United States Patent
Rao

(10) Patent No.: US 12,710,809 B2
(45) Date of Patent: Aug. 18, 2026

(54) INTERACTION INTERFACE DISPLAY FOLLOWING METHOD, ELECTRONIC DEVICE, MEDIUM, AND CHIP

(71) Applicant: Beijing Zitiao Network Technology Co., Ltd., Beijing (CN)

(72) Inventor: Xiaolin Rao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/393,620

(22) Filed: Dec. 21, 2023

(65) Prior Publication Data

US 2024/0211031 A1 Jun. 27, 2024

(30) Foreign Application Priority Data

Dec. 26, 2022 (CN) ......................... 202211671618.1

(51) Int. Cl.
*G06F 3/01* (2006.01)
*G09G 3/00* (2006.01)

(52) U.S. Cl.
CPC ............. *G06F 3/012* (2013.01); *G09G 3/001* (2013.01); *G06F 3/013* (2013.01); *G09G 2340/0464* (2013.01); *G09G 2354/00* (2013.01)

(58) Field of Classification Search
None
See application file for complete search history.

(56) References Cited

U.S. PATENT DOCUMENTS 10,976,808 B2 * 4/2021 Rochford ................ G06T 15/20
2016/0062457 A1 * 3/2016 Kobayashi ............. G06F 3/013 345/156
2016/0210783 A1 * 7/2016 Tomlin ................. G02B 27/017
2018/0047332 A1 * 2/2018 Kuwahara ............... G06F 3/012
2018/0096503 A1 * 4/2018 Kaehler .................. G06F 3/011
2020/0035208 A1 * 1/2020 Kudo ....................... G09G 5/00
2022/0392111 A1 * 12/2022 Sztuk ..................... G06V 20/20
2023/0185365 A1 * 6/2023 Rahman ............ G02B 27/0093 345/156
2024/0152244 A1 * 5/2024 DeDonato .............. G06F 1/163

FOREIGN PATENT DOCUMENTS

CN 107977083 A 5/2018
CN 111459277 A 7/2020

* cited by examiner

*Primary Examiner* — Matthew Yeung
(74) *Attorney, Agent, or Firm* — BakerHostetler

(57) ABSTRACT

The present disclosure discloses an interaction interface display following method, an electronic device, a readable storage medium, and a chip, which relate to the field of interface following technology. The interaction interface display following method includes: acquiring the wearing position information of an extended reality display device; determining the position information of an interaction interface in a virtual interface of the extended reality display device; and adjusting a display position of the interaction interface, so that the wearing position information corresponds to the position information of the interaction interface after being adjusted.

8 Claims, 6 Drawing Sheets

INTERACTION INTERFACE DISPLAY FOLLOWING METHOD, ELECTRONIC DEVICE, MEDIUM, AND CHIP

CROSS-REFERENCE TO RELATED APPLICATION

The present application claims priority of the Chinese Patent Application No. 202211671618.1, filed on Dec. 26, 2022, the disclosure of which is incorporated herein by reference in its entirety as part of the present application.

TECHNICAL FIELD

The embodiments of the present disclosure relate to the field of interface following, in particular to an interaction interface display following method, an interaction interface display following apparatus, an electronic device, a readable storage medium, a chip, and a computer program product.

BACKGROUND

At present, in the case where a user uses an extended reality (XR) device, the sight moves as the body turns. The present interface display, especially for the interaction interface, is usually fixed in a position. When the position is required to be adjusted, the button on the handle is required to be clicked manually, thereby correcting the interaction interface. The operation is cumbersome, and in the process of the user turning the head frequently, information may be missed.

SUMMARY

The purpose of the embodiments of the present disclosure is to provide an interaction interface display following method, an interaction interface display following apparatus, an electronic device, a readable storage medium, a chip, and a computer program product, which can solve the problem that the synchronization following of the interface and the sight has a poor effect during using an XR device.

In the first aspect, the embodiments of the present disclosure provide an interaction interface display following method. The method includes: acquiring wearing position information of an extended reality display device; determining position information of an interaction interface in a virtual interface of the extended reality display device; and adjusting a display position of the interaction interface so that the wearing position information corresponds to the position information of the interaction interface after being adjusted.

In the second aspect, the embodiments of the present disclosure provide an apparatus for following an interaction interface display, which includes: a wearing acquisition module, an interface determination module, and an adjustment module. The wearing acquisition module is configured to acquire wearing position information of an extended reality display device. The interface determination module is configured to determine position information of an interaction interface in a virtual interface of the extended reality display device. The adjustment module is configured to adjust a display position of the interaction interface so that the wearing position information corresponds to the position information of the interaction interface after being adjusted.

In the third aspect, the embodiments of the present disclosure provide an electronic device. The electronic device includes a processor, a memory, and programs or instructions that are stored on the memory and executable on the processor. When the programs or instructions are executed by the processor, cause the processor to implement steps of the method in the first aspect.

In the fourth aspect, the embodiments of the present disclosure provide a readable storage medium. Programs or instructions are stored on the readable storage medium. When the programs or instructions are executed by a processor, cause the processor to implement steps of the method in the first aspect.

In the fifth aspect, the embodiments of the present disclosure provide a chip. The chip includes a processor and a communication interface. The communication interface is coupled to the processor, and the processor is configured to execute programs or instructions to implement steps of the method in the first aspect.

In the sixth aspect, the embodiments of the present disclosure provide a computer program product. When programs or instructions that are included in the computer program product are executed on a computer, the computer executes steps of the method in the first aspect.

In the embodiments of the present disclosure, when using an extended reality display device, in order to see the content more clearly, a turning head operation inevitably occurs. In this case, an interaction interface exists in the interface displayed by the extended reality display device. When the turning head operation occurs, the interaction interface can be shifted, and cannot follow the sight of a user, causing the interaction interface to be shifted relative to the sight of the user. The present disclosure, mainly by acquiring wearing position information of the extended reality display device, and adjusting the position of the interaction interface in the extended reality display device in real time, can keep the sight of the user synchronized with the position of the interaction interface, which greatly increases the amount of important information that is acquired by the user, and reduces the occurrence of information omissions.

It is emphasized that in the present disclosure, the acquisition for the wearing position information and the position information of the interaction interface is in real time. In the case where a user frequently turns the head, the interaction interface can also be controlled to follow synchronously. After the user turns in any direction, the interaction interface can be displayed in the corresponding position.

It is noted that, as long as the display information in the interaction interface can be completely acquired by the user without turning, the correspondence relationship between the wearing position information and the position information of the interaction interface can be achieved.

The correspondence relationship between the reference numbers in FIGS. 5-7 and the component names is as follows:

100: electronic device; 101: radio frequency unit; 102: network module; 103: audio output unit; 104: input unit; 1041: graphics processor; 1042: microphone; 105: sensor; 106: display unit; 1061: display panel; 107: user input unit; 1071: touch panel; 1072: other input device; 108: interface unit; 1109: memory; 1110: processor; 900: interaction interface display following apparatus; 901: wearing acquisition module; 902: interface determination module; 903: adjustment module.

DETAILED DESCRIPTION

Combined with the drawings in the embodiments of the present disclosure, the following described the technical solution in the embodiment of the present disclosure clearly. Obviously, the described embodiments are some of the embodiments of the present disclosure, instead of all the embodiments. Based on the embodiments in the present disclosure, all other embodiments that are obtained by those of ordinary skill in the art belong to the protection scope of the present disclosure.

The terms "first", "second", etc. in the description and claims of the present disclosure are used to distinguish similar objects, and are not used to describe a specific order or sequence. It should be understood that the data so used can be exchanged with each other in an appropriate case, so that the embodiments of the present disclosure can be implemented in an order other than those illustrated or described herein. And the objects distinguished by "first", "second", etc. generally belong to one class, and the number of the objects is not limited, for example, the first object may be one or more than one. In addition, the words "and/or" in the description and claims indicate at least one of the connected objects, and the character "/" generally indicates that the associated objects are an "or" relationship.

Combined with the drawings from FIG. 1 to FIG. 7, the following illustrates an interaction interface display following method and an interaction interface display following apparatus, an electronic device, a readable storage medium, a chip, and a computer program product that are provided by the embodiments of the present disclosure in detail, through specific embodiments and their application scenarios.

Figure 1:
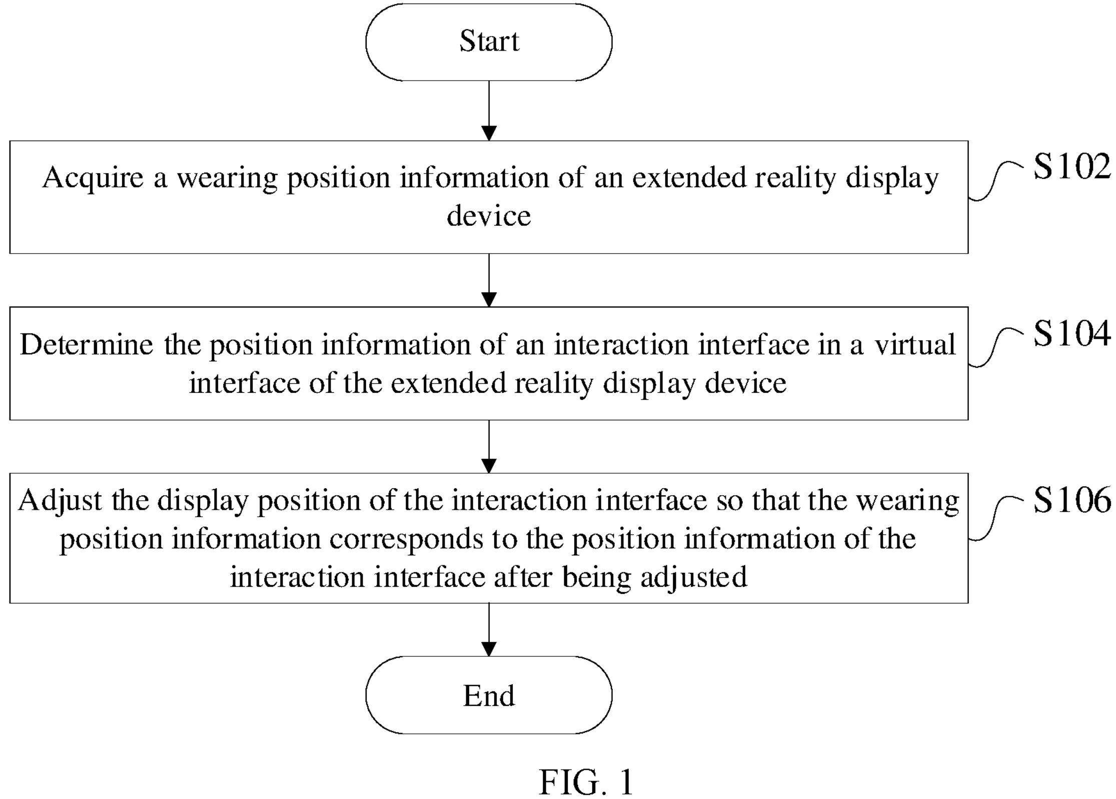
FIG. 1 illustrates a flowchart diagram of an interaction interface display following method according to an embodiment of the present disclosure.

The present embodiments provide an interaction interface display following method, as illustrated in FIG. 1, and the method includes:

Step S102: acquire wearing position information of an extended reality display device;

Step S104: determine the position information of an interaction interface in a virtual interface of the extended reality display device; and Step S106: adjust the display position of the interaction interface so that the wearing position information corresponds to the position information of the interaction interface after being adjusted.

When using an extended reality display device, in order to see the content more clearly, a head turning operation inevitably occurs. In this case, an interaction interface exists in the interface displayed by the extended reality display device. When the turning head operation occurs, the interaction interface may be shifted, and cannot follow the sight of the user, causing the interaction interface to be shifted relative to the sight of the user. The present disclosure, mainly by acquiring wearing position information of the extended reality display device, and adjusting the position of the interaction interface in the extended reality display device in real time, can keep the sight of the user synchronized with the position of the interaction interface, which greatly increases the amount of important information that is acquired by the user, and reduces the occurrence of information omissions.

It should be emphasized that in the case where the wearing position of the extended reality display device and the sight position are consistent, the obtained wearing position information can be directly served as the basis for adjusting the display position of the interaction interface. Moreover, in the present disclosure, the acquiring for the wearing position information and position information of the interaction interface is in real time. When the user frequently turns the head, the interaction interface is also controlled to follow synchronously. After the user turns in any direction, the interaction interface is displayed in the corresponding position.

It should be added that as long as the display information in the interaction interface can be completely acquired by the user without turning, the correspondence relationship between the wearing position information and the position information of the interaction interface can be achieved.

Further, in the case where the wearing position of the extended reality display device and the sight position are inconsistent, the wearing position information of the extended reality display device can be understood as the information including the position information of the extended reality display device, the relative position of the extended reality display device on the head of the user, whether the wearing position is correct, and whether the left and/or right offset or the up and/or down offset occurs, and so on.

Figure 2:
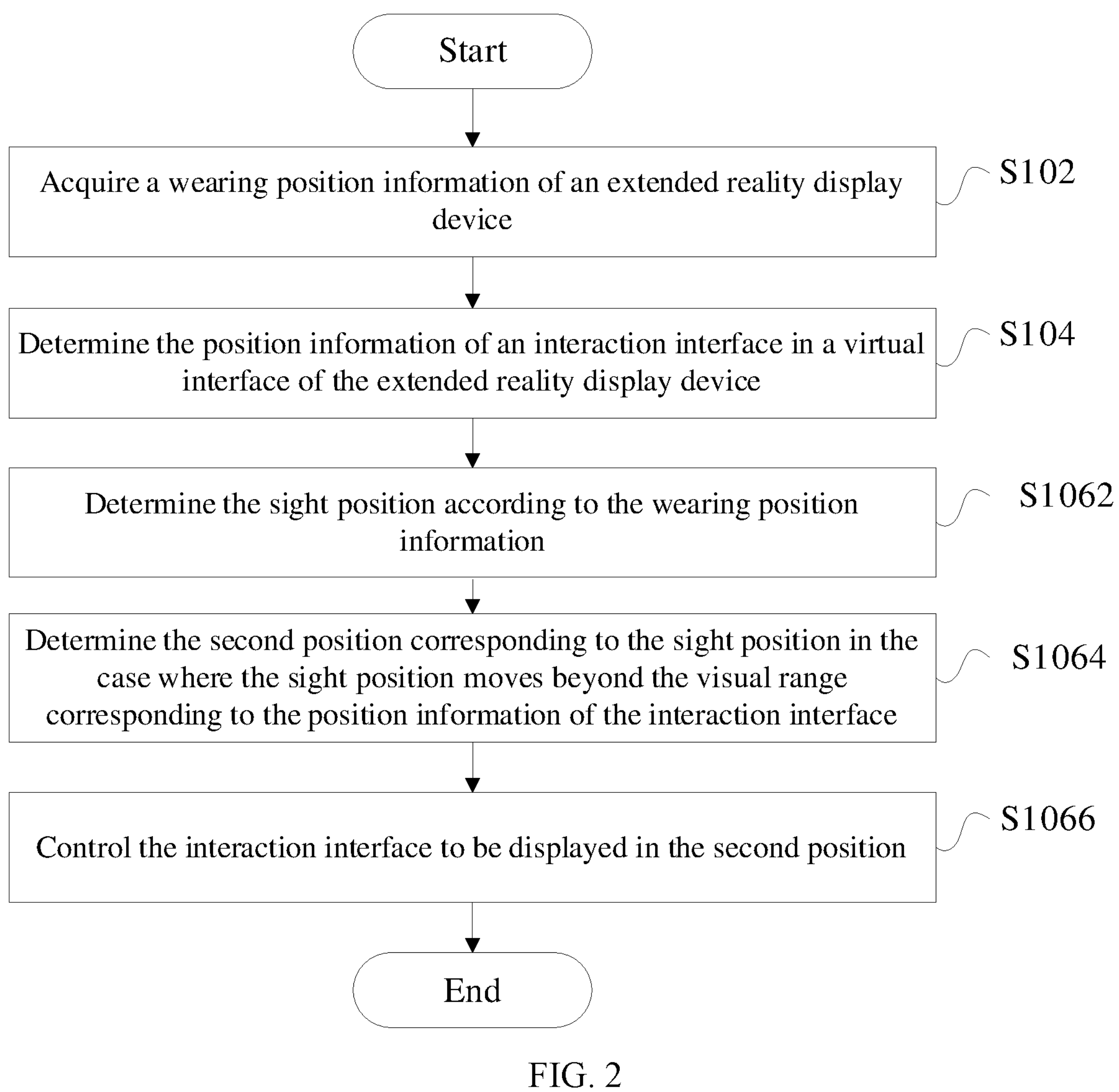
FIG. 2 illustrates a flowchart diagram of an interaction interface display following method according to an embodiment of the present disclosure.

Optionally, as illustrated in FIG. 2, the step of adjusting the display position of the interaction interface, so that the wearing position information corresponds to the position information of the interaction interface after being adjusted, includes:

Step S1062: determine the sight position according to the wearing position information;

Step S1064: determine the second position corresponding to the sight position in the case where the sight position moves beyond the visual range corresponding to the position information of the interaction interface; and Step S1066: control the interaction interface to be displayed in the second position.

When adjusting the display position of the interaction interface, the sight position, i.e., the head orientation of the user, is required to be determined firstly, according to the wearing position information of the extended reality display device. In other embodiments, the sight tracking apparatus can also be used to determine the sight position of the user directly, without acquiring the wearing position information.

In the case where the sight position of the user is beyond the visual range corresponding to the position information of the interaction interface, it is considered that the display position of the current interaction interface cannot be seen by the user, so the display position of the current interaction interface is required to be adjusted. The specific adjustment logic is that determining directly the second position corresponding to the sight position after moving, and displaying the interaction interface in the second position.

In one specific embodiment, in the case where the interaction interface is displayed in the second position, the interaction interface can be displayed directly, i.e., the display at the original position is canceled.

In another specific embodiment, in the case where the interaction interface is displayed in the second position, the interaction interface is displayed through the gradual transition from the original position to the second position.

Figure 3:
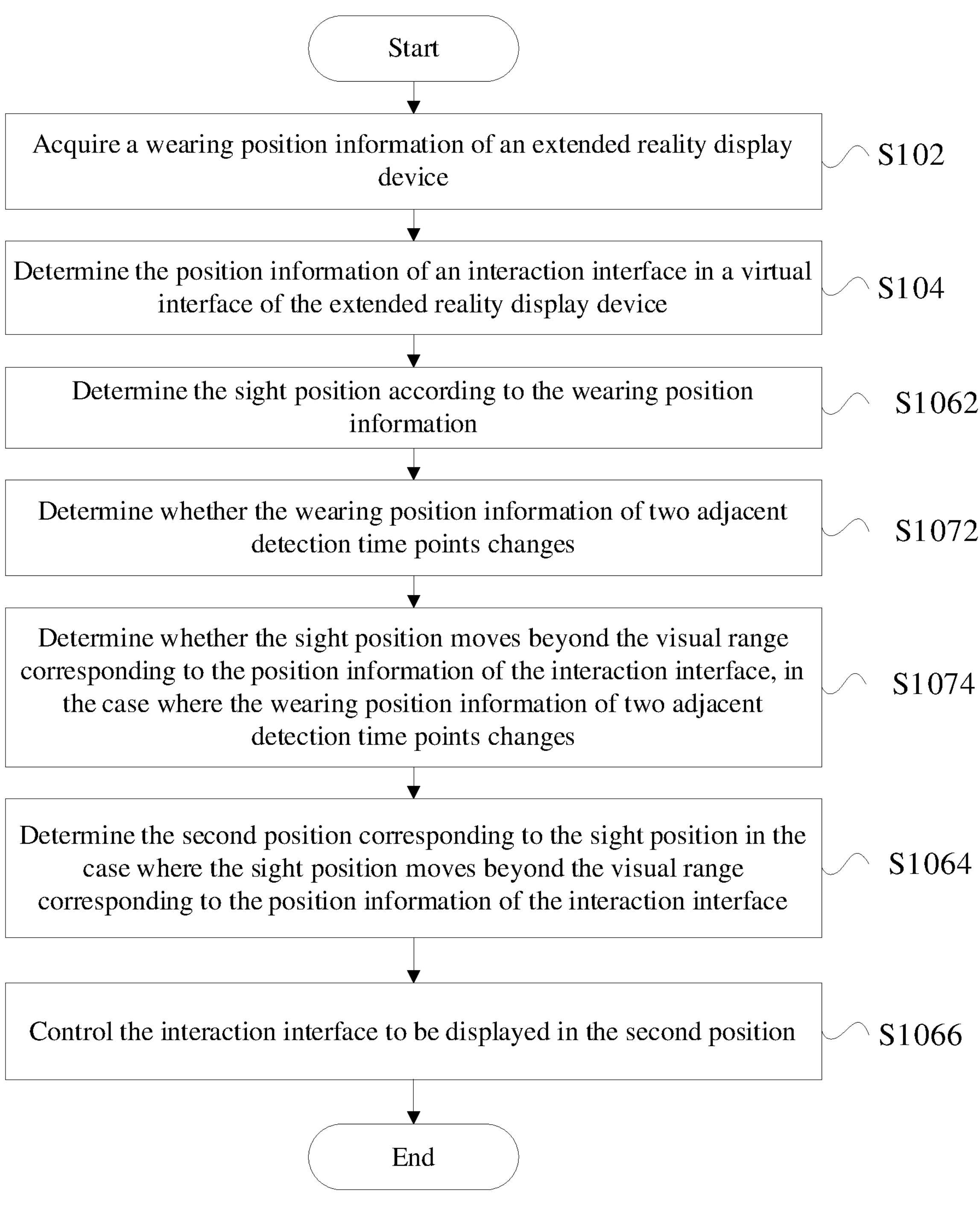
FIG. 3 illustrates a flowchart diagram of an interaction interface display following method according to an embodiment of the present disclosure.

Optionally, as illustrated in FIG. 3, after determining the sight position according to the wearing position information, the method includes:

Step S1072: determine whether the wearing position information at two adjacent detection time points changes; and Step S1074: determine whether the sight position moves beyond the visual range corresponding to the position information of the interaction interface, in the case where the wearing position information at two adjacent detection time points changes.

After determining the sight position, the determination of the movement for the sight position is mainly based on whether the wearing position information changes. Specifically, whether the wearing position information at two adjacent detection time points changes is determined according to the acquired wearing position information. Only on the premise that the wearing position information changes, then whether the sight position moves beyond the visual range corresponding to the position information of the interaction interface is determined. It should be noted that after the wearing position information changes, and the change may only be a small jitter, in this case the secondary determination on whether the sight position moves is required. Only in the case where the sight position is beyond the visual range corresponding to the position information of the interaction interface, it is considered that the display position of the interaction interface is required to be adjusted, otherwise the change of the sight position is a reasonable jitter, and the display position of the interface does not need to change.

The detection time point can be set flexibly, for example, the detection time point can be 1 frame, 1 second, or 5 seconds.

Figure 4:
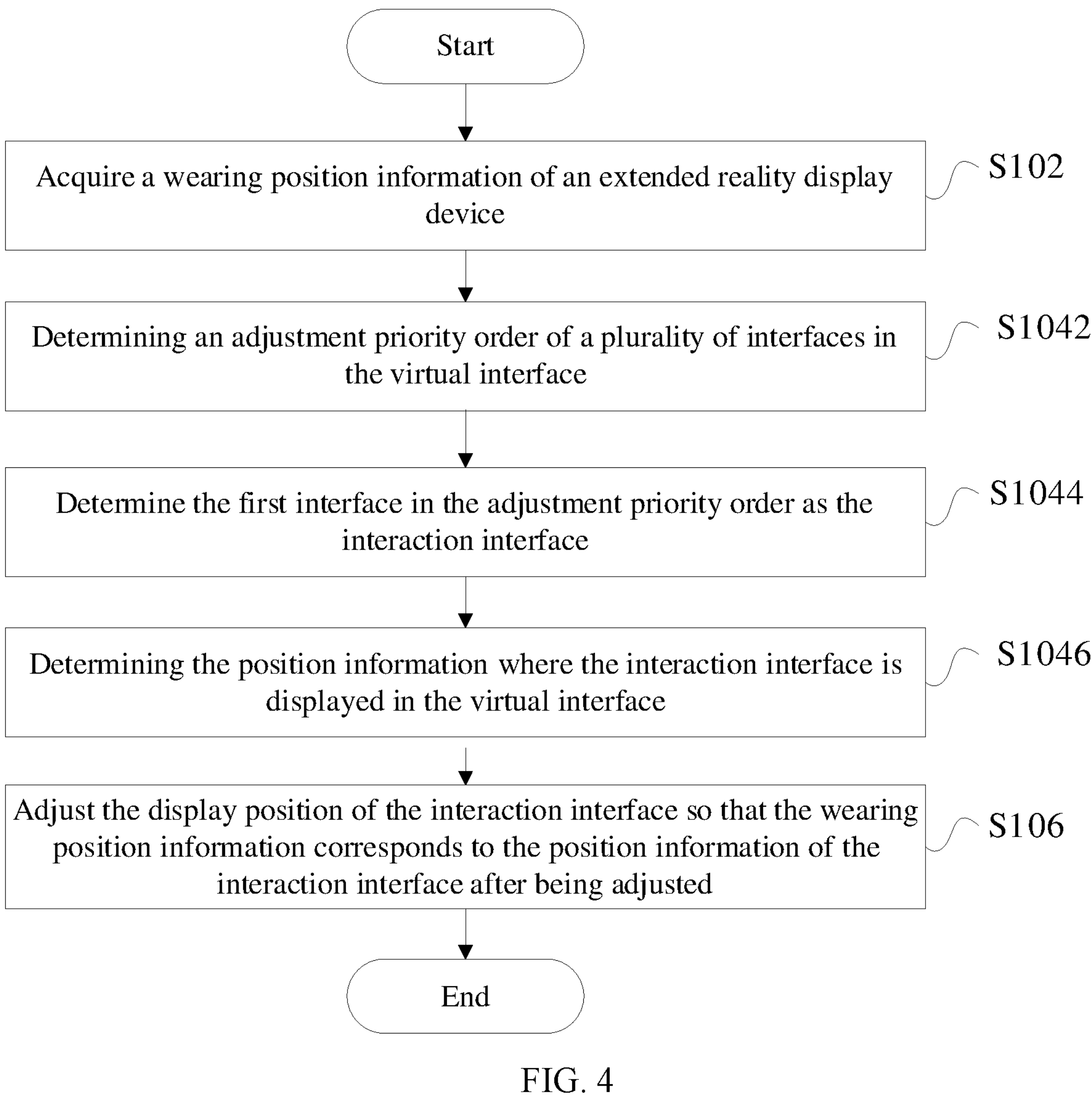
FIG. 4 illustrates a flowchart diagram of an interaction interface display following method according to an embodiment of the present disclosure.

Optionally, as illustrated in FIG. 4, the step of determining the position information of the interaction interface in the virtual interface of the extended reality display device, includes:

Step S1042: determine an adjustment priority order of a plurality of interfaces in the virtual interface;

Step S1044: determine the first interface in the adjustment priority order as the interaction interface; and Step S1046: determine the position information where the interaction interface is displayed in the virtual interface.

When determining the position information of the interaction interface in the virtual interface, all the interfaces included in the virtual interface are required to be determined at first, and then the adjustment priority order of all the interfaces is determined in sequence. The interface with the highest priority among the multiple interfaces is served as the interaction interface, i.e., the first interface in the adjustment priority order. The specific position where the interaction interface is displayed in the virtual interface is only required to be determined, which can implement the adjustment more conveniently when adjusting subsequently.

Understandably, the display of the interaction interface is placed in front of all the other interfaces, the display position of the interaction interface is adjusted so that the interaction interface can follow the sight of the user. No matter how the head of the user moves, the user can see the interaction interface in sight, so that the interaction is completed.

For the specific interaction interface displayed in front, the display priority order can be adjusted according to the user's own usage habits, and some more important interaction interfaces can be flexibly set as the interaction interfaces displayed in front.

Figure 5:
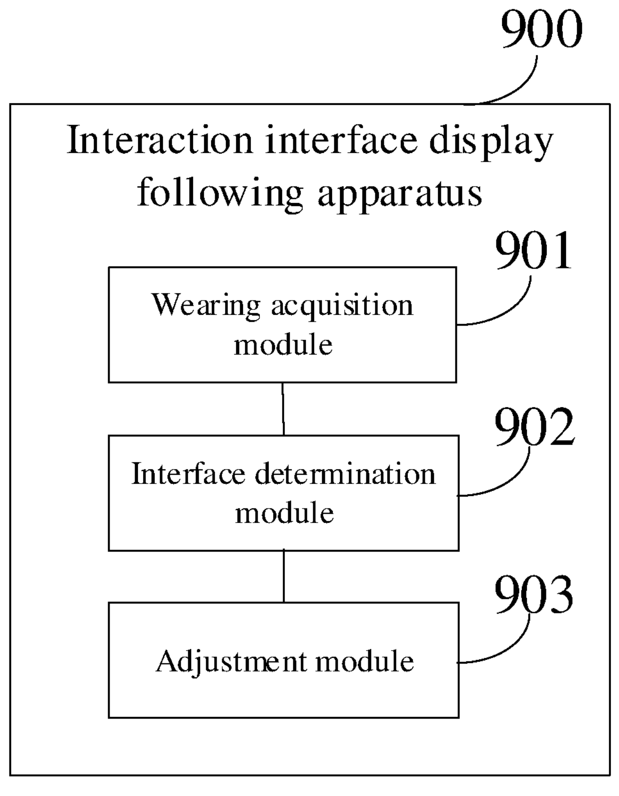
FIG. 5 illustrates a structure diagram of an interaction interface display following method according to an embodiment of the present disclosure.

As illustrated in FIG. 5, the embodiments of the present disclosure provide an interaction interface display following apparatus 900. The interaction interface display following apparatus 900 includes a wearing acquisition module 901, an interface determination module 902, and an adjustment module 903.

The wearing acquisition module 901 is configured to acquire the wearing position information of the extended reality display device. The interface determination module 902 is configured to determine the position information of the interaction interface in the virtual interface of the extended reality display device. The adjustment module 903 is configured to adjust the display position of the interaction interface, so that the wearing position information corresponds to the position information of the interaction interface after being adjusted.

Optionally, the adjustment module 903 is also configured to determine the sight position according to the wearing position information; determine the second position corresponding to the sight position, in the case where the sight position moves beyond the visual range corresponding to the position information of the interaction interface; and control the interaction interface to be displayed in the second position.

Optionally, the adjustment module 903 is also configured to determine whether the wearing position information at two adjacent detection time points changes; and determine whether the sight position moves beyond the visual range corresponding to the position information of the interaction interface in the case where the wearing position information at the two adjacent detection time points changes.

Optionally, the interface determination module 902 is also configured to determine the adjustment priority order of a plurality of interfaces in the virtual interface; determine the first interface in the adjustment priority order as the interaction interface; and determine the position information where the interaction interface is displayed in the virtual interface.

The interface display following apparatus in the embodiments of the present disclosure may be an apparatus, or a component, an integrated circuit or a chip in a terminal. The apparatus may be a mobile electronic device or a non-mobile electronic device. For example, the mobile electronic device may be a mobile phone, a tablet, a laptop, a PDA, an in-vehicle electronic device, a wearable device, an ultra-mobile personal computer (UMPC), a netbook, or a personal digital assistant (PDA), etc., and the non-mobile electronic device may be a server, a network attached storage (NAS), a personal computer (PC), a television (TV), a teller machine, or a self-service machine, etc. The embodiments of the present disclosure do not define the mobile or non-mobile electronic device specifically.

The interaction interface display following apparatus in the embodiments of the present disclosure may be an apparatus with an operating system. The operating system may be an Android operating system, an iOS operating system, or other possible operating systems. The embodiments of the present disclosure do not define the operating system specifically.

The interaction interface display following apparatus that is provided by the embodiments of the present disclosure can implement the various processes that are implemented by the method embodiments of FIG. 1 to FIG. 4. In order to avoid duplication, it is not repeated herein.

Figure 6:
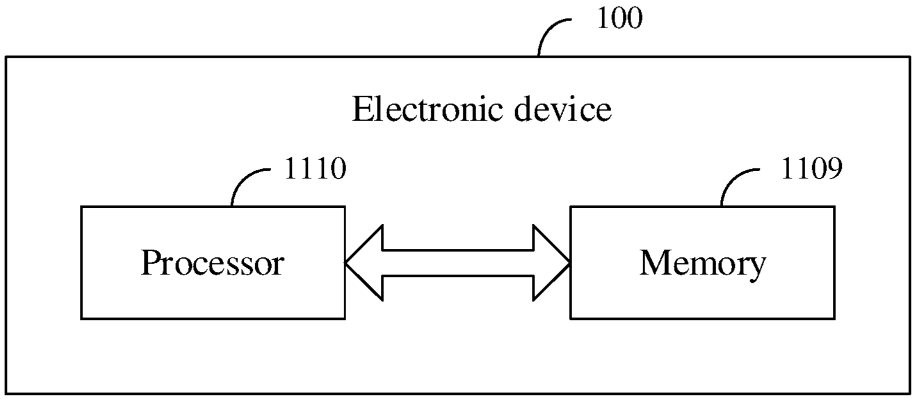
FIG. 6 illustrates a structure diagram of an electronic device according to an embodiment of the present disclosure.

Optionally, as illustrated in FIG. 6, the embodiments of the present disclosure also provide an electronic device 100, which includes a processor 1110, a memory 1109, and programs or instructions that are stored on the memory 1109 and can be executed by the processor 1110. Upon the programs or instructions being executed by the processor 1110, the various processes of the embodiments of the above interaction interface display following method are implemented and can achieve the same technical effect. In order to avoid duplication, it is not repeated herein.

It is required to note that the electronic device in the embodiments of the present disclosure includes the electronic devices and non-electronic devices that are described above.

Figure 7:
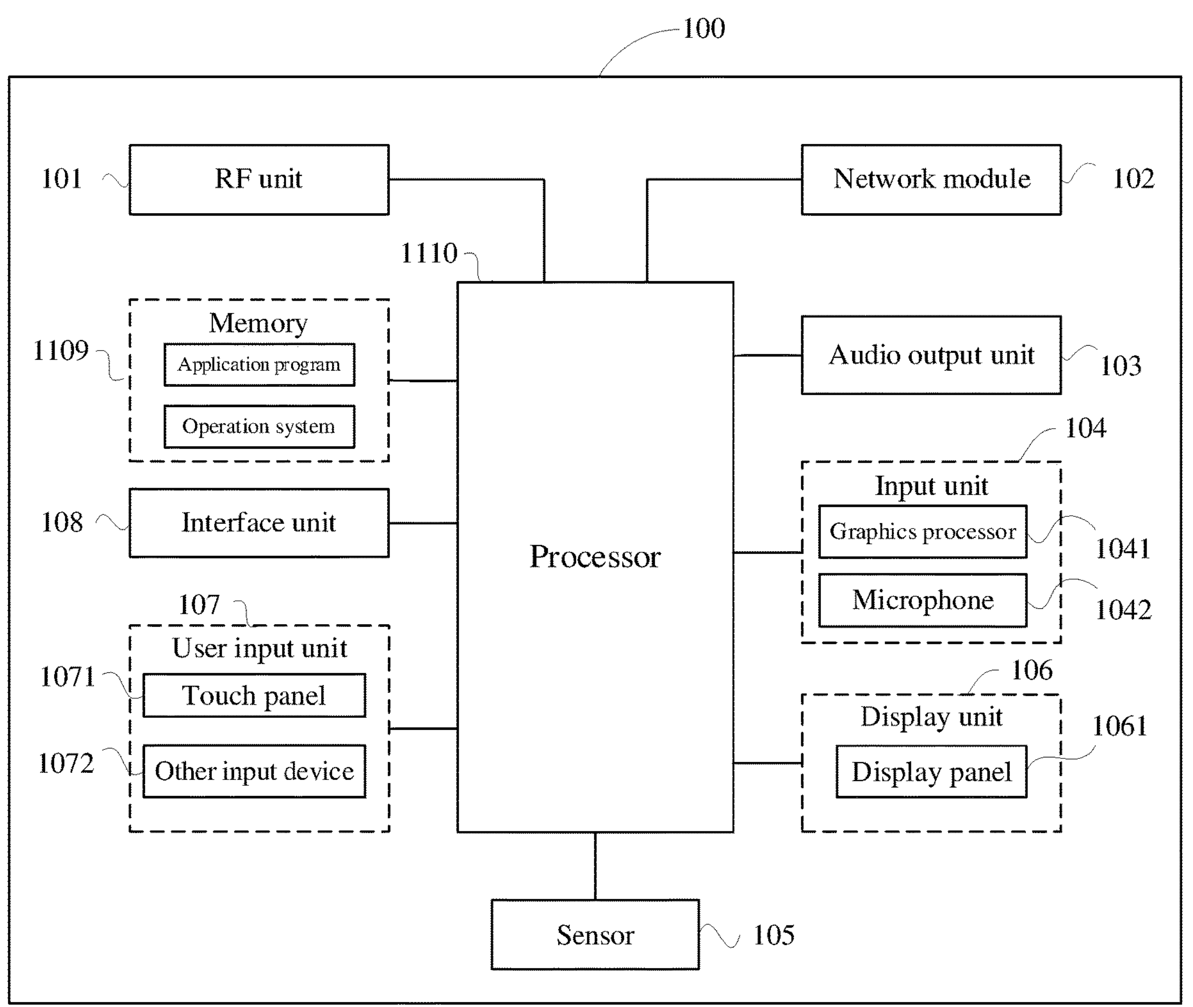
FIG. 7 illustrates a structure diagram of an electronic device according to an embodiment of the present disclosure.

FIG. 7 is a hardware structure diagram of an electronic device to implement the embodiments of the present disclosure.

The electronic device 100 includes, but is not limited to: a radio frequency unit 101, a network module 102, an audio output unit 103, an input unit 104, a sensor 105, a display unit 106, a user input unit 107, an interface unit 108, a memory 1109, a processor 1110 and other components.

Those skilled in the art are able to understand that the electronic device 100 may also include a power supply (e.g. a battery) that supplies power to various components. The power supply can be logically connected to the processor 1110 through a power management system, thereby implementing functions such as managing charging, discharging, power consumption, and so on through the power management system. The structure of the electronic device illustrated in FIG. 7 does not constitute a limit to the electronic device, and the electronic device may include more or fewer components than those illustrated in FIG. 7, or a combination of some components, or a different arrangement of components, which is not repeated herein.

The processor 1110 is configured to acquire the wearing position information of an extended reality display device; determine the position information of the interaction interface in the virtual interface of the extended reality display device; and adjust the display position of the interaction interface so that the wearing position information corresponds to the position information of the interaction interface after being adjusted.

The above solution, by acquiring the wearing position information of the extended reality display device, and adjusting the position of the interaction interface in real time, makes the sight of the user be synchronized with the position of the interaction interface, which greatly increases the amount of important information that is acquired by the user, and reduces the occurrence of information omissions.

Optionally, the processor 1110 is also configured to implement the following steps: determining the sight position according to the wearing position information; determining the second position corresponding to the sight position, in the case where the sight position moves beyond the visual range corresponding to the position information of the interaction interface; and controlling the interaction interface to be displayed in the second position.

Optionally, the processor 1110 is also configured to determine whether the wearing position information at two adjacent detection time points changes; and determine whether the sight position moves beyond the visual range corresponding to the position information of the interaction interface, in the case where the wearing position information at the two adjacent detection time points changes.

Optionally, the processor 1110 is further configured to determine the adjustment priority order of a plurality of interfaces in the virtual interface; determine the first interface in the adjustment priority order as the interaction interface; and determine the position information where the interaction interface is displayed in the virtual interface.

Understandably, in the embodiments of the present disclosure, an input unit 104 may include a graphics processing unit (GPU) 1041 and a microphone 1042. The graphics processor 1041 processes the image data of a still picture or video that is acquired by an image capture apparatus (such as a camera) in the video capture mode or the image capture mode. A display unit 106 may include a display panel 1061, and the display panel 1061 may be configured in the form of a liquid crystal display, an organic light-emitting diode, etc. A user input unit 107 includes a touch panel 1071 and other input devices 1072. The touch panel 1071 is also known as a touch screen. The touch panel 1071 may include two parts, a touch detection device and a touch controller. The other input devices 1072 may include, but are not limited to, a physical keyboard, a function key (such as a volume control key, a switch button, etc.), a trackball, a mouse, and a joystick, which is not repeated herein. A memory 1109 may be configured to store software programs and various data, including but not limited to application programs and operating systems. A processor 1110 may integrate an application processor and a modem processor, wherein the application processor mainly processes the operating system, the user interface, the application programs, etc., and the modem processor mainly processes wireless communication. Understandably, the above modem processor may also not be integrated into the processor 1110.

The embodiments of the present disclosure also provide a readable storage medium. Programs or instructions are stored on the readable storage medium. When the programs or instructions are executed by a processor, the various processes of the embodiments of the above interaction interface display following method are implemented and can achieve the same technical effect. In order to avoid duplication, it is not repeated herein.

The processor is the processor in the electronic device in the above embodiments. The readable storage medium includes a computer-readable storage medium, such as a read-only memory (ROM), a random access memory (RAM), a disk, or an optical disk.

The embodiments of the present disclosure provide a chip. The chip includes a processor and a communication interface. The communication interface is coupled to the processor and the processor is configured to execute programs or instructions, which implements the various processes of the embodiments of the above interaction interface display following method and can achieve the same technical effect. In order to avoid duplication, it is not repeated herein.

Understandably, the chip mentioned in the embodiments of the present disclosure may also be referred to as a system level chip, a system chip, a chip system or a system-on-chip, and etc.

The embodiments of the present disclosure also provide a computer program product. When programs or instructions that are included in the computer program product are executed on a computer, the computer executes the steps of the interaction interface display following method in the method embodiment.

It is required to note that, in the present disclosure, the term "including", "comprising", or any other variation thereof is intended to cover the non-exclusive inclusion, so that a process, method, article or apparatus of a series of elements includes not only those elements, but also other elements that are not expressly listed, or also includes elements that are inherent to such process, method, article or device. Without more limitations, an element that is qualified by the statement "including a . . . " does not exclude the existence of another identical element in the process, method, article or apparatus including the element. In addition, it is required to note that the scope of the method and apparatus in the embodiments of the present disclosure is not limited to performing functions in the order that is illustrated or discussed, and may also include performing functions in a substantially simultaneous manner or in a reverse order according to the functions involved. For example, the described method may be performed in an order distinct from the described order, and various steps may also be added, omitted, or combined. In addition, features that are described by reference to some examples can be combined in other examples.

By the description of the above embodiments, those skilled in the art can clearly understand that the above embodiment method may be implemented by the mean of software plus the necessary general hardware platform, of course, by hardware, but in many cases the former is a better embodiment. Based on this understanding, essentially, the technical solution of the present disclosure or the part that contributes to the prior art may be embodied in the form of a computer software product. The computer software product is stored in a storage medium (such as a ROM/RAM, a disk, or an optical disk), and includes a number of instructions that are used to enable a terminal (may be a mobile phone, a computer, a server, or a network device, etc.) to perform the method that is described in the various embodiments of the present disclosure.

The embodiments of the present disclosure are described above in conjunction with the drawings, but the present disclosure is not limited to the above specific embodiments. The above specific embodiments are only exemplary, and not restrictive. Those of ordinary skill in the art under the inspiration of the present disclosure, without departing from the purpose of the disclosure and the protection scope that is determined by the appended claims, may also make many forms, can also make many forms, all of which are in the protection scope of the present disclosure.

What is claimed is:

1. A method, comprising:

acquiring wearing position information of an extended reality display device, wherein the wearing position information comprises information indicating a position of a head of a user wearing the extended reality display device;

determining a display position of an interaction interface in a virtual interface displayed by the extended reality display device;

detecting whether a head turning operation occurs based on the acquired wearing position information;

determining whether the position of the head moves beyond a visual range corresponding to the display position of the interaction interface, wherein the interaction interface is not visible by the user when the position of the head moves beyond the visual range corresponding to the display position of the interaction interface, and wherein the interaction interface is one of a plurality of interfaces included in the virtual interface displayed by the extended reality display device; and in response to determining that the position of the head moves beyond the visual range corresponding to the display position of the interaction interface, controlling the interaction interface based on the position of the head by adjusting the display position of the interaction interface in the virtual interface, wherein the adjusted display position of the interaction interface corresponds to a direction to which the head has turned.

2. The method of claim 1, further comprising:

determining whether the wearing position information at two adjacent detection time points changes; and determining whether the position of the head of the user has moved beyond the visual range corresponding to the display position of the interaction interface based on determining that the wearing position information at the two adjacent detection time points changes.

3. The method of claim 1, wherein the method comprises:

determining an adjustment priority order of the plurality of interfaces in the virtual interface; and determining a first interface in the adjustment priority order as the interaction interface.

4. An electronic device, comprising a processor, a memory, and programs or instructions that are stored on the memory and executable on the processor, when the programs or instructions are executed by the processor, cause the processor to:

acquire wearing position information of an extended reality display device, wherein the wearing position information comprises information indicating a position of a head of a user wearing the extended reality display device;

determine a display position of an interaction interface in a virtual interface displayed by the extended reality display device;

detect whether a head turning operation occurs based on the acquired wearing position information;

determine whether the position of the head moves beyond a visual range corresponding to the display position of the interaction interface, wherein the interaction interface is not visible by the user when the position of the head moves beyond the visual range corresponding to the display position of the interaction interface, and wherein the interaction interface is one of a plurality of interfaces included in the virtual interface displayed by the extended reality display device; and in response to determining that the position of the head moves beyond the visual range corresponding to the display position of the interaction interface, control the interaction interface based on the position of the head by adjusting the display position of the interaction interface in the virtual interface, wherein the adjusted display position of the interaction interface corresponds to a direction to which the head has turned.

5. The electronic device of claim 4, wherein the processor is further caused to:

determine whether the wearing position information at two adjacent detection time points changes; and determine whether the position of the head of the user has moved beyond the visual range corresponding to the display position of the interaction interface based on determining that the wearing position information at the two adjacent detection time points changes.

6. The electronic device of claim 4, wherein the processor is further caused to:

determine an adjustment priority order of the plurality of interfaces in the virtual interface; and determine a first interface in the adjustment priority order as the interaction interface.

7. A non-transitory computer-readable storage medium, wherein programs or instructions are stored on the readable storage medium, and when the programs or instructions are executed by a processor, cause the processor to:

acquire wearing position information of an extended reality display device, wherein the wearing position information comprises information indicating a position of a head of a user wearing the extended reality display device;

determine a display position of an interaction interface in a virtual interface displayed by the extended reality display device;

detect whether a head turning operation occurs based on the acquired wearing position information;

determine whether a position of the head moves beyond a visual range corresponding to the display position of the interaction interface, wherein the interaction interface is not visible by the user when the position of the head moves beyond the visual range corresponding to the display position of the interaction interface, and wherein the interaction interface is one of a plurality of interfaces included in the virtual interface displayed by the extended reality display device; and in response to determining that the position of the head moves beyond the visual range corresponding to the display position of the interaction interface, control the interaction interface based on the position of the head by adjusting the display position of the interaction interface in the virtual interface, wherein the adjusted display position of the interaction interface corresponds to a direction to which the head has turned.

8. A chip, comprising a processor and a communication interface, wherein the communication interface is coupled with the processor, and the processor is configured to execute programs or instructions to implement the method of claim 1.

* * * * *